US012728353B2

(12) United States Patent
Benbassat

(10) Patent No.: US 12,728,353 B2
(45) Date of Patent: Sep. 8, 2026

(54) ADAPTIVE GAME ADJUSTMENTS

(71) Applicant: Sony Interactive Entertainment LLC, San Mateo, CA (US)

(72) Inventor: Alex Benbassat, Los Angeles, CA (US)

(73) Assignee: Sony Interactive Entertainment LLC

(*) Notice: Subject to any disclaimer, the term of this patent is extended or adjusted under 35 U.S.C. 154(b) by 325 days.

(21) Appl. No.: 18/322,868

(22) Filed: May 24, 2023

(65) Prior Publication Data

US 2024/0390798 A1 Nov. 28, 2024

(51) Int. Cl.
*A63F 13/67* (2014.01)
*A63F 13/212* (2014.01)
*A63F 13/69* (2014.01)

(52) U.S. Cl.
CPC ............ *A63F 13/67* (2014.09); *A63F 13/212* (2014.09); *A63F 13/69* (2014.09)

(58) Field of Classification Search
CPC ......... A63F 13/67; A63F 13/212; A63F 13/69
See application file for complete search history.

(56) References Cited

U.S. PATENT DOCUMENTS 5,001,632 A * 3/1991 Hall-Tipping .......... A63F 13/57 482/902
7,331,870 B2 2/2008 Smith et al.
10,307,589 B2 6/2019 Reider
10,646,711 B2 5/2020 Reider
11,351,465 B1 6/2022 Litman
2006/0219776 A1 10/2006 Finn
2007/0066403 A1* 3/2007 Conkwright .......... A63F 13/803 463/43
2007/0079137 A1 4/2007 Tu
2009/0270170 A1 10/2009 Patton
2010/0033303 A1* 2/2010 Dugan .................... G01P 15/02 340/5.82
2010/0113152 A1 5/2010 Shmuel
2011/0009193 A1 1/2011 Bond et al.
2012/0046113 A1* 2/2012 Ballas ..................... A63F 13/00 463/43
2013/0218588 A1 8/2013 Kehr et al.
2014/0221785 A1 8/2014 Pacione et al.
2014/0342324 A1 11/2014 Ghovanloo et al.
2014/0364212 A1* 12/2014 Osman .................. A63F 13/212 463/31
2015/0196804 A1 7/2015 Koduri et al.
2016/0042648 A1 2/2016 Kothuri
2016/0353252 A1 12/2016 Krasadakis
2017/0003740 A1 1/2017 Verfaillie et al.
(Continued)

FOREIGN PATENT DOCUMENTS

WO 2010010776 A1 1/2010

OTHER PUBLICATIONS

"International Search Report and Written Opinion", dated Sep. 18, 2024, from the counterpart PCT application PCT/US24/029617.
(Continued)

*Primary Examiner* — Kevin Y Kim
(74) *Attorney, Agent, or Firm* — Kilpatrick Townsend & Stockton LLP

(57) ABSTRACT

A biometric sensor such as a heart rate sensor sends signals representative of a video gamer's physical state, e.g., heart rate, to a computer game system for use of the physical state in developing future games or improving the current game.

20 Claims, 7 Drawing Sheets

(56) References Cited

U.S. PATENT DOCUMENTS

2017/0169379 A1 6/2017 Horseman et al.
2018/0075764 A1 3/2018 Bachani
2018/0103867 A1 4/2018 Stephens et al.
2018/0286272 A1 10/2018 Mcdermott et al.
2019/0038180 A1 2/2019 Tzvieli et al.
2019/0230387 A1 7/2019 Gersten
2020/0085312 A1 3/2020 Tzvieli et al.
2020/0129856 A1 4/2020 Bond et al.
2020/0197812 A1 * 6/2020 Sensui ................ A63F 13/5375
2020/0357299 A1 11/2020 Patel et al.
2020/0405213 A1 12/2020 Chappell, III et al.
2021/0069552 A1 3/2021 Yang et al.
2021/0085255 A1 3/2021 Vule et al.
2021/0129032 A1 5/2021 Elenbaas et al.
2021/0225505 A1 7/2021 Khare et al.
2021/0401339 A1 12/2021 Farber et al.
2022/0164024 A1 5/2022 Palazzo et al.
2022/0168634 A1 6/2022 Ambinder et al.
2022/0191348 A1 6/2022 Sarkar
2022/0384027 A1 12/2022 Kaleal et al.
2022/0415134 A1 12/2022 Inamdar
2023/0078380 A1 3/2023 Zaghetto et al.
2024/0390788 A1 11/2024 Benbassat

OTHER PUBLICATIONS

Final Office Action issued in related U.S. Appl. No. 18/322,939 on Oct. 22, 2025; 11 pages.
U.S. Appl. No. 18/322,939, "Non-Final Office Action", Apr. 24, 2025, 11 pages.
PCT/US2024/028533, "International Search Report and Written Opinion", Aug. 26, 2024, 9 pages.
PCT/US2024/029394, "International Search Report and Written Opinion", Aug. 21, 2024, 8 pages.
PCT/US2024/029623, "International Search Report and Written Opinion", Aug. 27, 2024, 8 pages.
U.S. Appl. No. 18/322,939, "Non-Final Office Action", Apr. 15, 2026, 17 pages.

* cited by examiner

ADAPTIVE GAME ADJUSTMENTS

FIELD

The present application relates generally to techniques for collecting gamer heart rates for game developer feedback.

BACKGROUND

Computer simulations such as computer games (also referred to herein as video games) are created by game developers with an eye toward maximizing player (gamer) enjoyment.

SUMMARY

As understood herein, game developers "tune" their games using various "tunables", which are factors tending to increase enjoyment of playing a video game.

Accordingly, a system includes at least one computer medium that is not a transitory signal and that in turn includes instructions executable by at least one processor to receive indication of heart rate of at least one player of at least one computer game, and receive at least one segment of at least one computer game generated at least partially in response to the indication of the heart rate of the player.

In example embodiments the segment of at least one computer game is received from input by a human developer. In other embodiments the segment of at least one computer game is received from a machine learning (ML) model. The ML model can be trained on a data set that includes heart rates and associated game segments.

The segment of the computer game can be inserted into an updated version of the computer game. Or, the segment of the computer game can be provided in a new game different from the original game from whence the heart rate was detected.

In some implementations the instructions can be executable to, for a first heart rate and a first game segment type, receive a first segment, and for the first heart rate but a second game segment type, receive a second segment different from the first segment.

In another aspect, a method includes generating, using at least one biometric sensor, at least a first signal representing a physical state of at least one player of at least one computer simulation. The method also includes using the first signal to generate a replacement segment for the computer simulation, and/or using the first signal to generate a new computer simulation. The biometric sensor may include one or more of a pulse sensor, an iris sensor, a voice sensor, a galvanic skin response (GSR) sensor, a breath rate sensor, and a nanotechnology sensor.

In another aspect, an apparatus includes at least one biometric sensor engageable with a computer gamer for generating signals representing at least one physiological condition of the computer gamer during play of a computer game, and at least one computer configured to output at least one computer game segment responsive to receiving indication of the signals from the at least one biometric sensor.

The details of the present application, both as to its structure and operation, can be best understood in reference to the accompanying drawings, in which like reference numerals refer to like parts, and in which:

DETAILED DESCRIPTION

Figure 1:
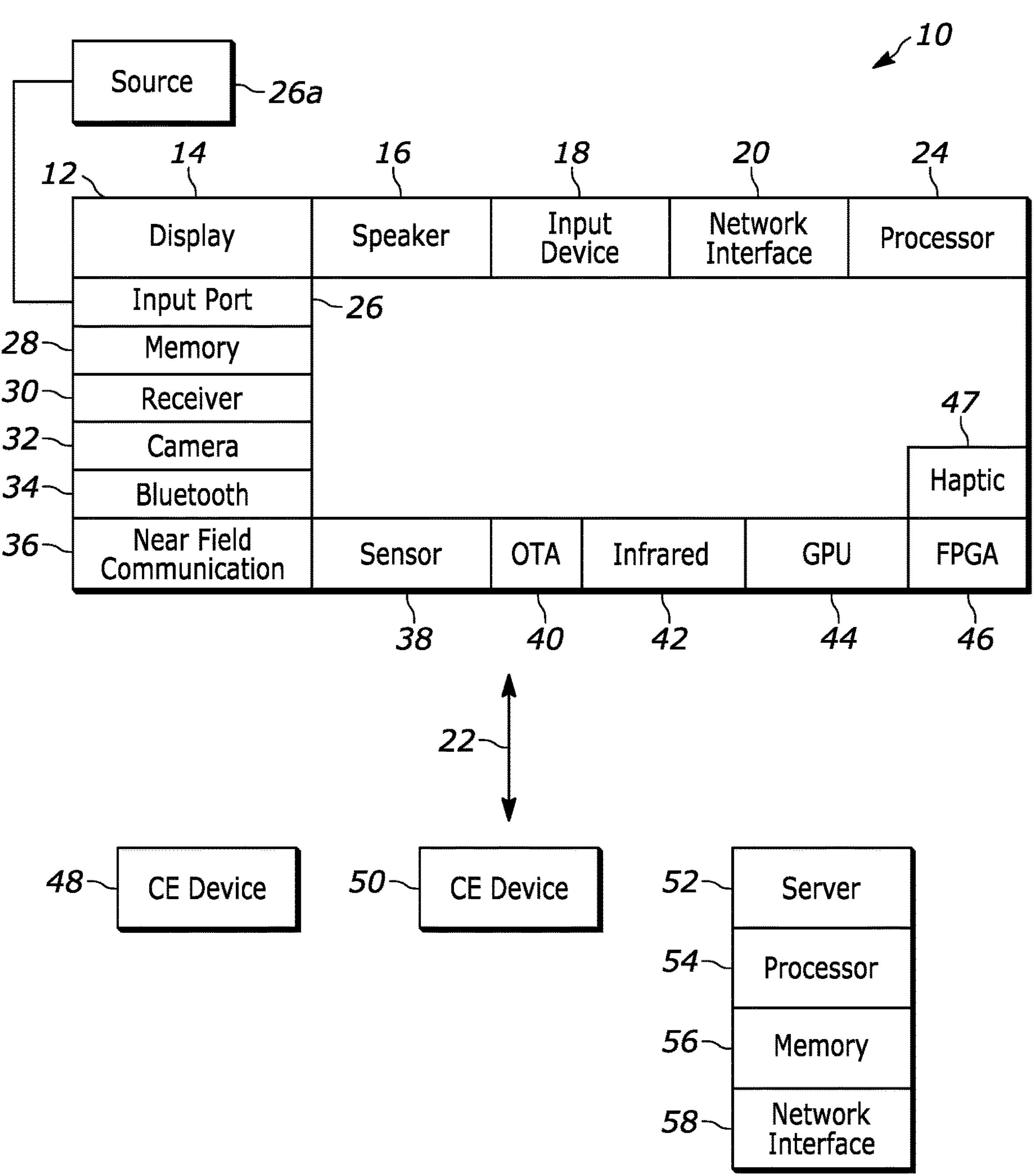
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers. A processor assembly may include one or more processors acting independently or in concert with each other to execute an algorithm.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a*, when implemented as a game console may include some or all of the components described below in relation to the CE device 48**.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server “farm” and may include and perform “cloud” functions such that the devices of the system 10 may access a “cloud” environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. A network contemplated herein can include a large language model (LLM) such as a generative pre-trained transformer (GPTT).

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
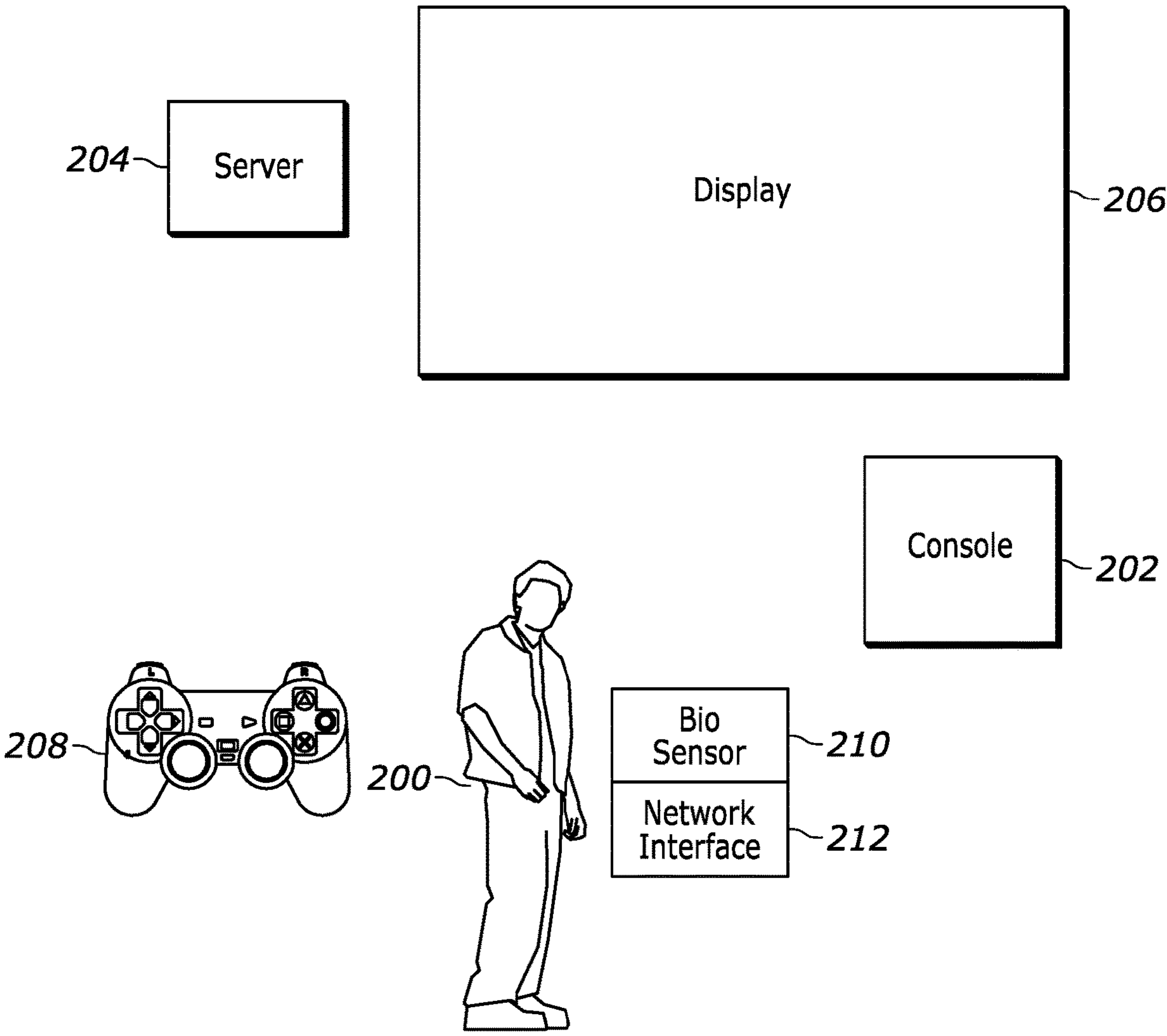
FIG. 2 illustrates an example specific system that may use components from FIG. 1.

Turning to FIG. 2, a computer gamer or player 200 plays a computer game sourced from a computer game console 202 and/or one or more computer game servers 204 as presented on one or more displays 206 by operating one or more computer game controllers 208. One or more biometric sensors 210 may be engaged with the gamer 200 to provide biometric signals to the gaming system via one or more network interfaces 212 such as a wireless transceiver. The biometric signals represent a physical parameter or state of the gamer 200. The signals may be communicated to, e.g., the console 202 via Bluetooth, or the server 204 via Wi-Fi, or by other means.

Disclosure herein uses, as an example biometric sensor, a heart rate or pulse sensor. It is to be understood that other types of biometric sensors with supporting systems include iris sensors, voice sensors, face recognition systems, galvanic skin response (GSR) sensors, breath sensors including breath rate sensors, nanotechnology sensors, and other physiological sensors operating on chemical, electrochemical, optical, and electromagnetic bases.

Figure 3:
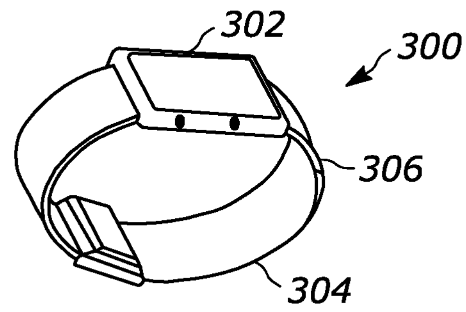
FIG. 3 illustrates an example wristwatch-like device for holding a biometric sensor.
Figure 4:
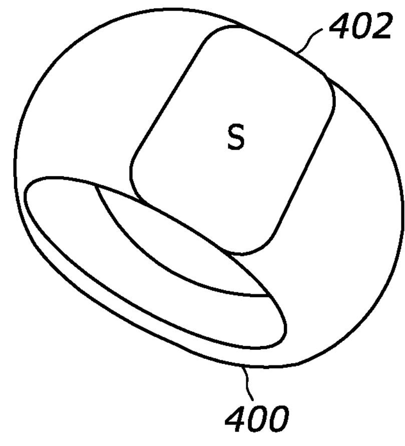
FIG. 4 illustrates an example finger ring for holding a biometric sensor.
Figure 5:
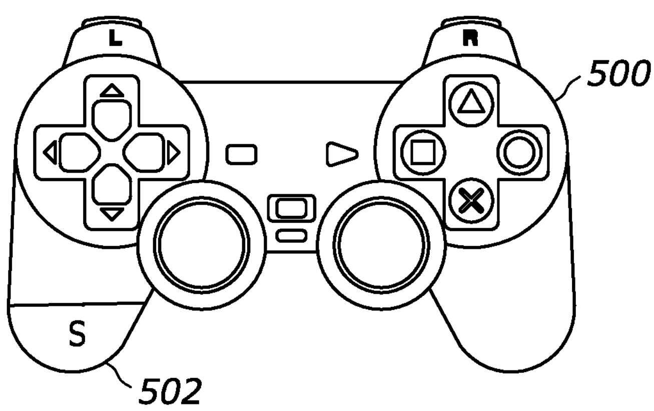
FIG. 5 illustrates an example computer game controller for holding a biometric sensor.

A biometric sensor according to present principles may be engaged with the gamer 200 by various means. In FIG. 3, for instance, a wristwatch-shaped device 300 with face 302 and wristband 304 holds one or more biometric sensors 306. In FIG. 4, a finger ring 400 holds one or more biometric sensors 402. In FIG. 5, a computer game controller 500 holds one or more biometric sensors 502.

Figure 6:
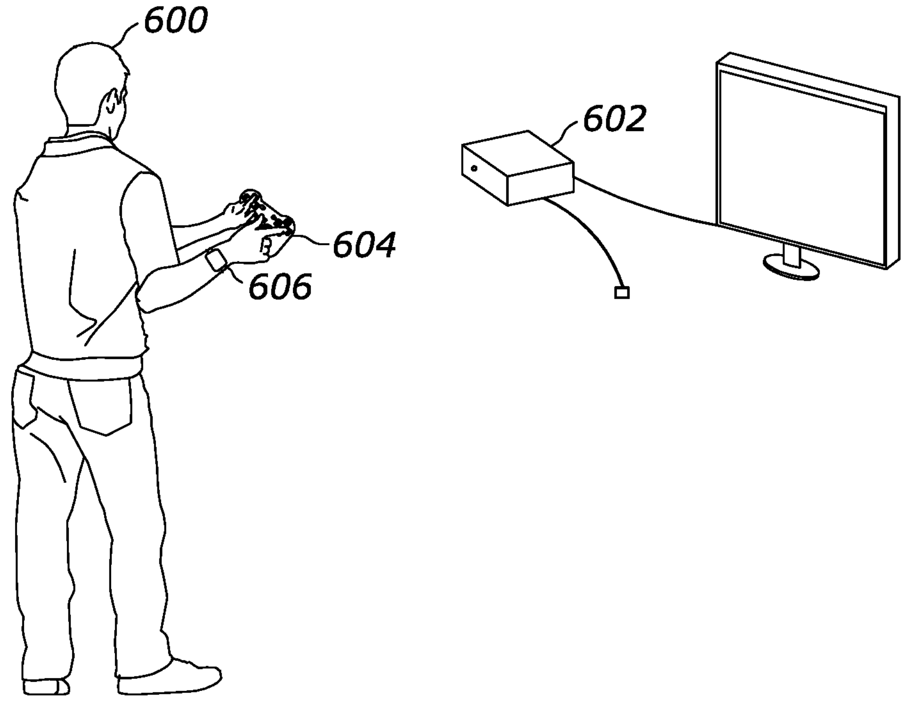
FIG. 6 illustrates a gamer playing a video game juxtaposed with a graph of the gamer's heart rate over time with labels indicating scene types.
Figure 6:
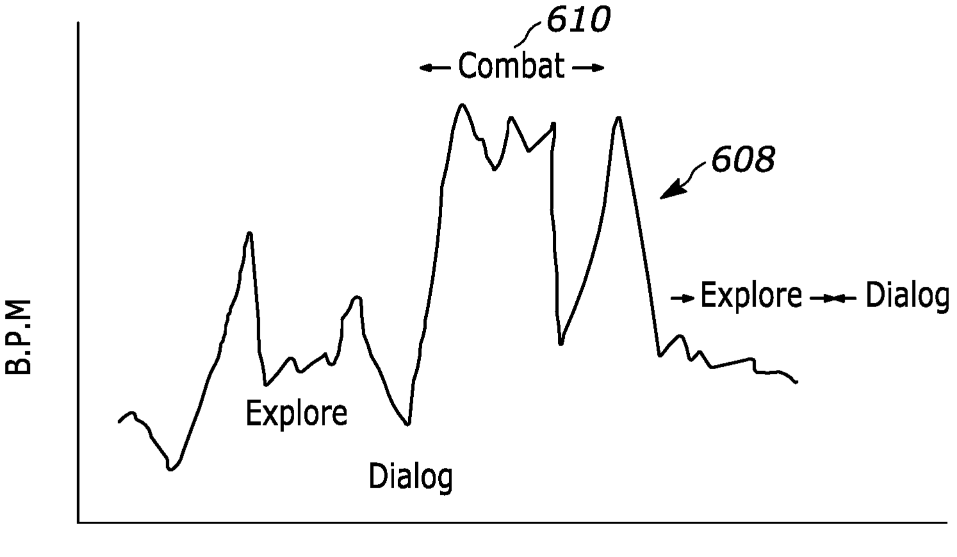

FIG. 6 illustrates a gamer 600 playing a video game/computer game being presented on a display 602 under control of a manipulable controller 604. A biometric sensor 606 such as a heart rate sensor is engaged with the gamer 600 via a wristwatch-like mount to measure the gamer’s pulse, i.e., heart rate.

A graph 608 illustrates the output of the example pulse sensor 606 over time as the gamer plays the game. The y-axis represents beats per minute and the x-axis represents time. The output graph 608 may include annotations 610 indicating what type of scene was being viewed during periods of pulse rates. The annotations 608 may be, e.g., text annotations as shown, and/or color-coded segments of the graph 608, with red segments for example indicating “combat”, green segments indicating exploration, yellow segments indicating dialog scenes, and so on. Scene type may be obtained from game metadata and associated with or correlated to the segments of time corresponding to various segments of the graph 608.

Figure 7:
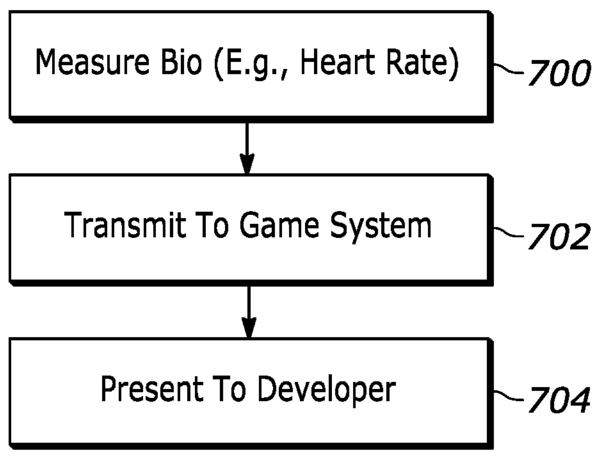
FIG. 7 illustrates example logic in example flow chart format for collecting biometric data for use as feedback to game developers.

FIG. 7 illustrates example logic in example flow chart format for collecting biometric data for use as feedback to game developers. Commencing at block 700, one or more biometric parameters of a gamer such as the gamer 600 shown in FIG. 6 for example, pulse rate, are measured by one or more biometric sensors, such as pulse sensors indicating heart rate over time. The output of the sensor(s) is transmitted to the game system at block 702 using, for example, Bluetooth or Wi-Fi and employing application programming interfaces (API) as appropriate. Both game time and absolute time may be associated with the pulse of the gamer so that periods of pulse measurements may be correlated with scene type in the game during each period. This feedback from block 702 is provided to human and/or machine learning (ML)-implemented game developers at block 704.

Figure 8:
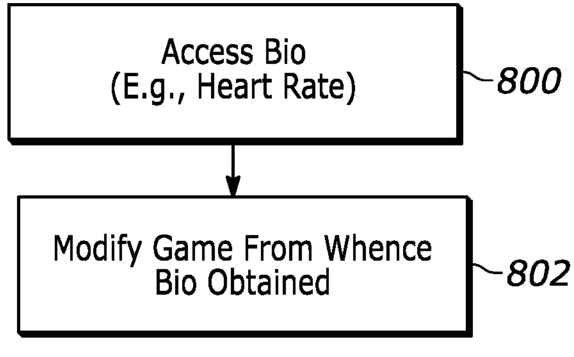
FIG. 8 illustrates example logic in example flow chart format for modifying a game according to biometric feedback.

FIG. 8 illustrates example logic in example flow chart format for modifying a game according to biometric feedback. A human and/or ML-implemented game developer receives the biometric feedback from block 704 in FIG. 7 at block 800 in FIG. 8. It is to be noted that a single heart rate from a single player may be used or the average of multiple heart rates of multiple players playing the same computer game/segment may be used.

Moving to block 802, the developer modifies one or more segments of the game from whence the biometric feedback was generated, e.g., as software patches or modified game versions to be provided to gamers. For example, a scene may be moved from one temporal location in a game to another in response to the biometric feedback. As an example, a scene resulting in higher pulse rates may be moved back to be played later in the game. Or, the number of game characters in a virtual space of the game may be limited to not exceed a maximum number in response to the biometric feedback. As an example, in a scene that induces higher pulse rates, no more than two game characters may be allowed to enter a virtual room in the game. Or, difficulty in aiming weapons may be added or subtracted in response to the biometric feedback. As an example, difficulty in aiming may be increased responsive to lower pulse rates and decreased responsive to higher pulse rates. Game music may be changed in response to the biometric feedback. As an example, more mellow music may be employed in scenes inducing higher pulse rates and more energetic music may be employed in scenes inducing lower pulse rates. Yet again, one or more sound effects (SFX) may be changed in response to the biometric feedback. As an example, louder SFX may be employed responsive to scenes inducing lower pulse rates and vice versa. The tone of voice of one or more game characters may change in response to the biometric feedback. As an example, in scenes inducing higher pulse rates, a character's voice may be toned down. Combinations of these modifications may be used.

Figure 9:
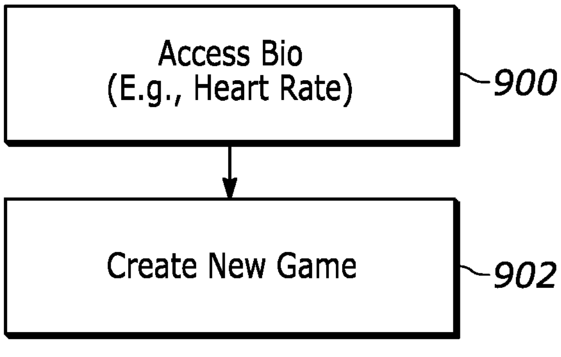
FIG. 9 illustrates example logic in example flow chart format for creating a new game based on the biometric feedback.

FIG. 9 illustrates example logic in example flow chart format for creating a new game based on the biometric feedback. A human and/or ML-implemented game developer receives the biometric feedback from block 704 in FIG. 7 at block 900 in FIG. 9. It is to be noted that a single heart rate from a single player may be used or the average of multiple heart rates of multiple players playing the same computer game/segment may be used.

Moving to block 902, the developer creates one or more scenes for a new game, i.e., a game other than the game from whence the biometric feedback was generated.

Figure 10:
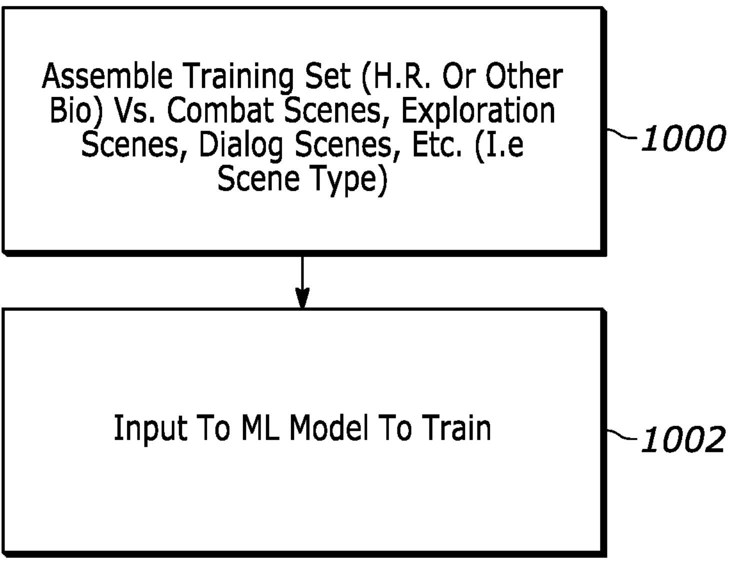
FIG. 10 illustrates example logic in example flow chart format for training a game development machine learning (ML) model.

FIG. 10 illustrates example logic in example flow chart format for training a game development machine learning (ML) model. Commencing at block 1000, a training set of ground truth data is assembly that includes heart rates and/or other biometric indications over time along with corresponding game information. In one embodiment that corresponding game information may be the type of scene for each segment of bio feedback, such as combat scene, dialog scene, an exploration scene.

In assembling this training set, experts may be employed to use biometric feedback of multiple gamers playing games deemed to be more interesting or successful than other games. The judgment of game success may be derived from gamer feedback, sales figures, or expert opinion, to name a few methods for determining success. The point is to tie game information of successful games to biometric feedback gathered from gamers playing successful games for the ML model to process and train on at block 1002. Thus, the trained model may output, for a first heart rate and a first game segment type, a first scene, whereas it may output, for the first heart rate but a second game segment type, a second scene different from the first scene.

Figure 11:
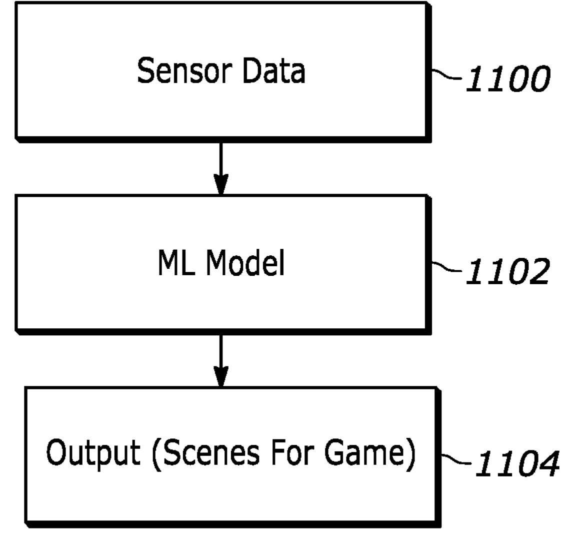
FIG. 11 illustrates a ML model-based development system.

FIG. 11 illustrates a ML model-based development system in which biometric sensor data 1100 is fed to a ML model 1102 trained as in FIG. 10 to output replacement scenes for the game from whence the biometric feedback was derived at block 1104. The replacement scenes can be incorporated into future releases of the game, for example. It may be appreciated that the ML model 1102 may include an LLM such as a GPTT.

Figure 12:
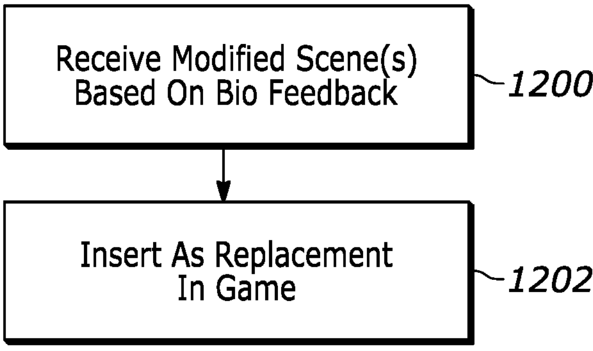
FIG. 12 illustrates example logic in example flow chart format for specific game modification.

FIG. 12 illustrates example logic in example flow chart format for specific game modification. Commencing at block 1200, modified scenes such as may be output by a human developer viewing bio feedback or by a ML model 1102 are received. The modified scenes are inserted into the game at block 1202 for release of modified versions of the game from whence the bio feedback was obtained.

Figure 13:
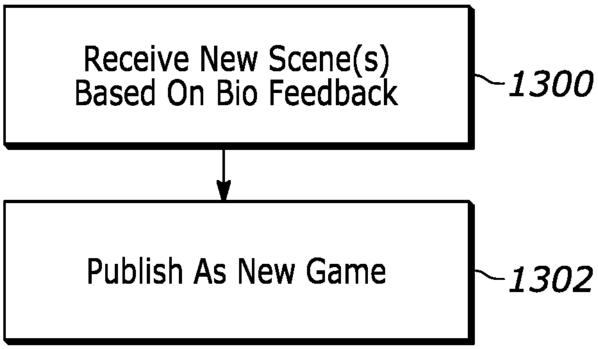
FIG. 13 illustrates example logic in example flow chart format for specific new game generation.

FIG. 13 illustrates example logic in example flow chart format for specific new game generation. Commencing at block 1300, new game scenes such as may be output by a human developer viewing bio feedback or by a ML model 1102 are received. The new scenes are used to publish a new game at block 1302 which is a game other than the game from whence the bio feedback was obtained, i.e., not merely a modified version of the game from whence the bio feedback was obtained but an entirely new game with new characters, plot, dialog, etc.

While the particular embodiments are herein shown and described in detail, it is to be understood that the subject matter which is encompassed by the present invention is limited only by the claims.

What is claimed is:

1. A method comprising:

receiving, from at least one biometric sensor, a first signal representing a physical state of at least one player playing a first computer simulation during a time period, wherein the first computer simulation includes a plurality of scenes that are configured to be executed in a first sequential order;

identifying a first scene of the plurality of scenes that is outputted to the at least one player during a portion of the time period, wherein a first physical state of the at least one player is associated with the first scene for the portion of the time period; and generating, responsive to receiving the first signal, a second computer simulation including the plurality of scenes in a second sequential order, wherein the first scene in the second sequential order is temporally shifted relative to other scenes of the plurality of scenes compared to the first scene relative to other scenes in the first sequential order, and wherein a position of the first scene in the second sequential order is based at least in part on the first physical state.

2. The method of claim 1, wherein the second computer simulation comprises a new computer simulation separate from the first computer simulation.

3. The method of claim 1, comprising:

generating one or more new scenes not included in the plurality of scenes and based on the first signal.

4. The method of claim 3, comprising:

publishing a new computer simulation separate from the first computer simulation and the second computer simulation, wherein the new computer simulation includes the one or more new scenes.

5. The method of claim 1, wherein the biometric sensor comprises a pulse sensor.

6. The method of claim 1, wherein the biometric sensor comprises an iris sensor.

7. The method of claim 1, wherein the biometric sensor comprises a voice sensor.

8. The method of claim 1, wherein the biometric sensor comprises a galvanic skin response (GSR) sensor.

9. The method of claim 1, wherein the biometric sensor comprises at least one of a breath rate sensor or a nanotechnology sensor.

10. The method of claim 1, wherein generating the second computer simulation uses a simulation type of the first computer simulation.

11. A system comprising:

one or more storage media storing instructions; and one or more processors configured to execute the instructions to cause the system to:

receive, from at least one biometric sensor, a first signal representing a physical state of at least one player playing a first computer simulation during a time period, wherein the first computer simulation includes a plurality of scenes that are configured to be executed in a first sequential order;

identify a first scene of the plurality of scenes that is outputted to the at least one player during a portion of the time period, wherein a first physical state of the at least one player is associated with the first scene for the portion of the time period; and generate, responsive to receiving the first signal, a second computer simulation including the plurality of scenes in a second sequential order, wherein the first scene in the second sequential order is temporally shifted relative to other scenes of the plurality of scenes compared to the first scene relative to other scenes in the first sequential order, and wherein a position of the first scene in the second sequential order is based at least in part on the first physical state.

12. The system of claim 11, wherein identification of the first scene is based at least in part on input received by a user interface.

13. The system of claim 11, wherein the instructions are executable to:

annotate each scene of the plurality of scenes with a scene type label determined from metadata associated with the first computer simulation.

14. The system of claim 11, wherein the second computer simulation comprises an updated version of the first computer simulation.

15. The system of claim 11, wherein the second computer simulation comprises a new computer simulation separate from the first computer simulation.

16. The system of claim 11, wherein the instructions are executable to:

for a first heart rate and a first game scene type, receive the first scene, and for the first heart rate but a second game scene type, receive a second scene different from the first scene.

17. The system of claim 13, wherein temporally shifting the first scene is performed based at least in part annotations of the plurality of scenes.

18. The system of claim 11, wherein the first scene occurs later in time in the second computer simulation as compared to the first computer simulation.

19. One or more non-transitory computer-readable storage media storing instructions that, upon execution by one or more processors of a system, cause the system to perform operations comprising:

receiving, from at least one biometric sensor, a first signal representing a physical state of at least one player playing a first computer simulation during a time period, wherein the first computer simulation includes a plurality of scenes that are configured to be executed in a first sequential order;

identifying a first scene of the plurality of scenes that is outputted to the at least one player during a portion of the time period, wherein a first physical state of the at least one player is associated with the first scene for the portion of the time period; and generating, responsive to receiving the first signal, a second computer simulation including the plurality of scenes in a second sequential order, wherein the first scene in the second sequential order is temporally shifted relative to other scenes of the plurality of scenes compared to the first scene relative to other scenes in the first sequential order, and wherein a position of the first scene in the second sequential order is based at least in part on the first physical state.

20. The non-transitory computer-readable storage media of claim 19, wherein temporally shifting the first scene is performed using a software patch.

* * * * *